(12) United States Patent
Long

(10) Patent No.: US 10,761,557 B2
(45) Date of Patent: Sep. 1, 2020

(54) MAGNETIC SPRING INCEPTOR

(71) Applicant: Wisk Aero LLC, Mountain View, CA (US)

(72) Inventor: Geoffrey Alan Long, Montara, CA (US)

(73) Assignee: WISK AERO LLC, Mountain View, CA (US)

(*) Notice: Subject to any disclaimer, the term of this patent is extended or adjusted under 35 U.S.C. 154(b) by 74 days.

(21) Appl. No.: 15/863,592

(22) Filed: Jan. 5, 2018

(65) Prior Publication Data
US 2018/0181161 A1 Jun. 28, 2018

Related U.S. Application Data

(63) Continuation of application No. 15/372,900, filed on Dec. 8, 2016, now Pat. No. 9,898,033.

(51) Int. Cl.
*G05G 9/047* (2006.01)
*G01D 5/14* (2006.01)
(Continued)

(52) U.S. Cl.
CPC ..... *G05G 9/04792* (2013.01); *B64C 13/0421* (2018.01); *B64C 29/0025* (2013.01);
(Continued)

(58) Field of Classification Search
CPC ........ G05G 9/047; B64C 13/04; G01D 5/142; H01F 7/02; H01F 7/0242; H01F 7/0273
See application file for complete search history.

(56) References Cited

U.S. PATENT DOCUMENTS 8,344,834 B2 * 1/2013 Niiyama ............... G06F 3/0338
335/205
2006/0205565 A1 9/2006 Feldman et al.
(Continued)

FOREIGN PATENT DOCUMENTS

DE 102011085146 4/2013
EP 2419805 2/2012
FR 3019327 10/2015

OTHER PUBLICATIONS

Application No. EP17878345.2, Extended European Search Report, dated Jul. 17, 2020, 8 pages.

*Primary Examiner* — Bernard Rojas
(74) *Attorney, Agent, or Firm* — Kilpatrick Townsend & Stockton LLP

(57) ABSTRACT

A magnetic spring input device is disclosed. In various embodiments, an input device as disclosed includes a manual input structure movably coupled to a base assembly; and a non-stationary magnet fixedly coupled to the manual input structure; a stationary magnet coupled to the base assembly in a manner that is fixed with respect to at least a first input axis of the input device, the stationary magnet being coupled to the base assembly with a first magnetic pole having a first magnetic polarity is oriented opposite a corresponding magnetic pole of the non-stationary magnet having the first magnetic polarity, in a position that is adjacent to but offset from the non-stationary magnet when the manual input structure is in a neutral position. The non-stationary magnet is coupled to the manual input structure in a position such that movement of the manual input structure about or along the first input axis of the input device brings said poles have said first magnetic polarity within sufficient proximity to generate a repulsive magnetic force.

19 Claims, 6 Drawing Sheets

(51) Int. Cl.
*B64C 13/04* (2006.01)
*B64C 29/00* (2006.01)
*G05G 5/05* (2006.01)

(52) U.S. Cl.
CPC ............... G01D 5/145 (2013.01); G05G 5/05 (2013.01); *G05G 2009/04766* (2013.01); *G05G 2009/04781* (2013.01)

(56) References Cited

U.S. PATENT DOCUMENTS

| | | |
|---|---|---|
| 2011/0155861 A1 | 6/2011 | Antraygue |
| 2013/0147642 A1 | 6/2013 | Rubio |
| 2015/0268691 A1 | 9/2015 | Schaub |
| 2016/0077543 A1* | 3/2016 | Conro .................... G05G 9/047 74/471 XY |

* cited by examiner

MAGNETIC SPRING INCEPTOR

CROSS REFERENCE TO OTHER APPLICATIONS

This application is a continuation of co-pending U.S. patent application Ser. No. 14/372,900 entitled MAGNETIC SPRING INCEPTOR filed Dec. 8, 2016 which is incorporated herein by reference for all purposes.

BACKGROUND OF THE INVENTION

Hand-operated controls, such as aircraft control sticks, joysticks, and other manual input devices operated at least in part by hand, collectively referred to herein as "inceptors", enable a pilot or other operator to provide manual input to control a controlled system, such as an aircraft, a drone or other remote control aircraft, a guided weapon, an electronic game, a robot or robotic arm or other element, heavy equipment, etc. Depending on the design, an operator may provide input by one or more of manipulating a hand grip in one or more directions, such as side-to-side, forward-and-back, and/or twisting about a vertical axis; operating a trigger or other finger-operated input device; and manipulating a thumb-operated input device, such as a thumbwheel, thumb-operated joystick, or button.

In simple mechanical systems, such as older aircraft, a control stick or other inceptor may be linked mechanically to a corresponding control surface of the aircraft. In most modern aircraft, however, control stick inputs cause an electronic output representative of the manual input to be provided. A flight control system may use the electronic output to determine and send control signals to corresponding flight control surfaces and/or motors, referred to collectively herein as "actuators".

In such electronic control systems, in aircraft and in other applications, a control stick may be equipped with mechanical springs or other structures configured and positioned so as to tend to return the control stick to a center position once the stick is released. In some systems, the springs may be configured to provide a haptic feedback to the operator (e.g., a sense of push back or resistance) so the operator has a sense that the desired input is being provided, including in some cases by giving the operator a sense of a degree to which the input device has been actuated within an available operating range.

Inceptor springs may be subjected to repeated stresses and as a result may fail after a certain number of cycles. Springs may exhibit a non-linear behavior at or near zero displacement, requiring pilots or other operators to apply a "breakout force" to manipulate an inceptor from the zero or "center" position, which some pilots may not find to be desirable.

BRIEF DESCRIPTION OF THE DRAWINGS

Various embodiments of the invention are disclosed in the following detailed description and the accompanying drawings.

DETAILED DESCRIPTION

Figure 1:
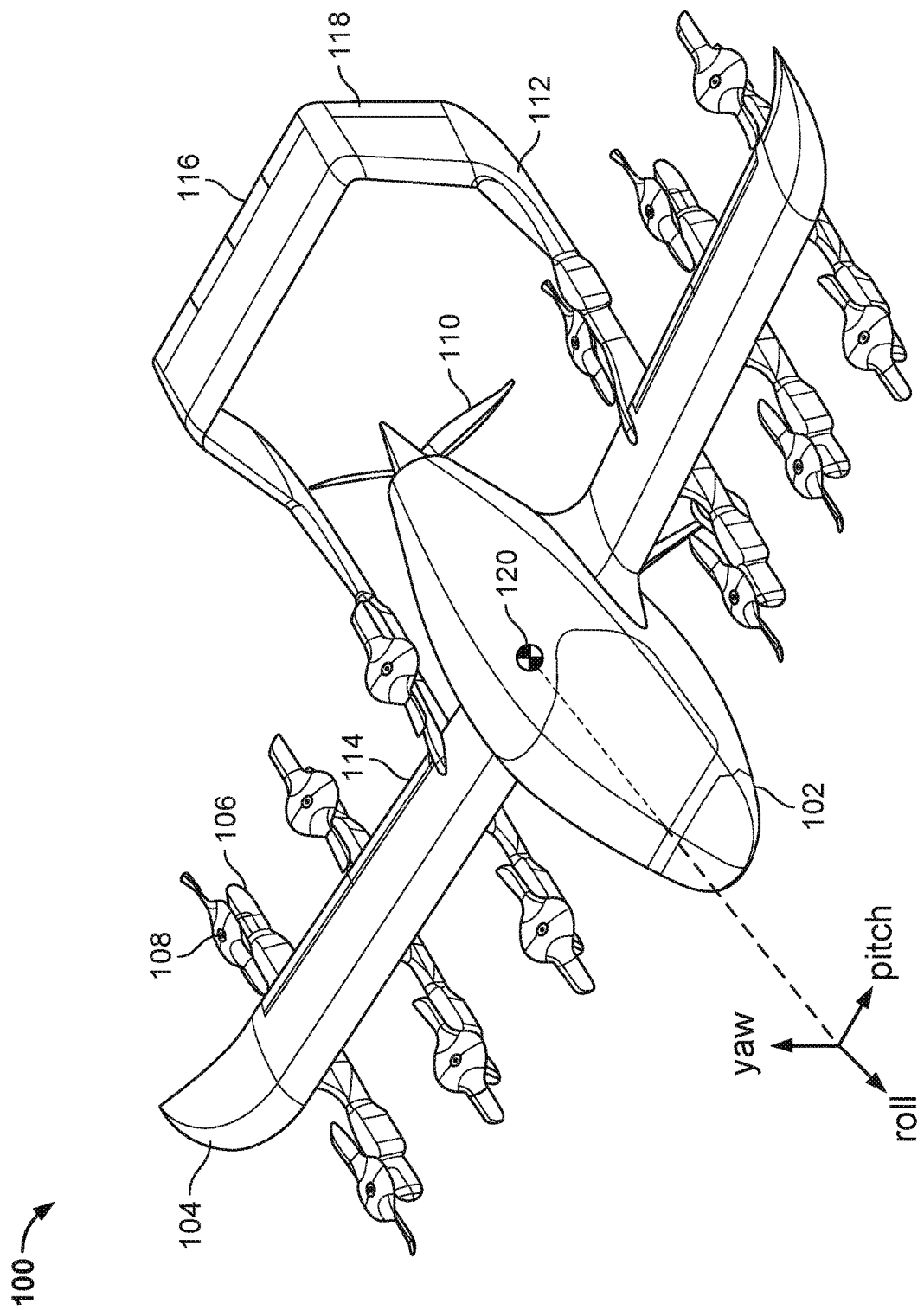
FIG. 1 is a diagram illustrating an embodiment of a multicopter aircraft.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A magnetic spring inceptor is disclosed. In various embodiments, one or more magnetic springs may be used to return a control stick or other inceptor to a center or other neutral position and/or to provide haptic feedback (e.g., of resistance) to an operator. The magnetic spring(s) may include one or more stationary magnets that remains stationary relatively to the control stick; one or more non-stationary magnets coupled to a movable element of the control stick, in proximity to the stationary magnet and positioned opposite the stationary magnet in a position offset from the stationary magnet when in the neutral position, with like magnetic poles of the stationary and non-stationary magnets facing each other; and one or more sensors that detect changes in a magnetic field, such as may be produced when one or more of said non-stationary magnets is moved relative to one or more of said non-stationary magnets, such as when a hand-manipulated movable element of the inceptor is moved by an operator.

In some embodiments, a non-stationary magnet may be integrated with a hand grip portion of an inceptor assembly. The hand grip may be affixed to an upper portion of a split inceptor shaft, the upper and lower portions of which may be coupled by a universal joint, such as a Hooke joint, in a manner that allows the hand grip to be tilted fore-and-aft and side-to-side about a center of rotation that coincides with one or both of the universal joint and a geometric or other center of the hand grip. In some embodiments, the non-stationary magnet may be a large cylindrical ring affixed inside an inner cavity of the hand grip. The non-stationary magnet in some embodiments has a sufficiently large inner diameter to allow the lower portion of the inceptor shaft to extend through the center of the non-stationary magnet. A stationary magnet, in some embodiments a smaller cylindrical ring in shape, may be affixed to the lower portion of the inceptor shaft. The lower portion of the inceptor shaft in some embodiments is secured in and to a base assembly in a manner that prevents movement relative to an x-y plane of the inceptor while allowing the lower portion of the inceptor shaft to be rotated about a longitudinal axis of the lower portion of the inceptor shaft, e.g., an axis orthogonal to the x-y plane of the inceptor.

In various embodiments, manipulation of the hand grip relative to the x-y plane of the inceptor, such as by tilting the handgrip forward or back, or from side to side, causes at least a part of the non-stationary magnet to be moved nearer to a corresponding part of the stationary magnet, bringing like magnetic poles of the respective magnets into closer proximity and thereby producing a repulsive force at least a component of which acts in a direction opposite a direction in which the non-stationary magnet is caused to be moved by the manipulation of the hand grip by the operator.

In various embodiments, movement of the non-stationary magnet as described above results in a corresponding change in a magnetic field produce collectively by the non-stationary and stationary magnets. In some embodiments, one or more linear Hall sensors may be used to measure changes in at least a component of said magnetic field that is orthogonal to the x-y plane of the inceptor. The sensor provides an output that is proportional to the change in the magnetic field. The sensor output may be mapped to one or more associated input values, such as input values for one or both of pitch and roll in the context of aircraft control.

In some embodiments, a magnetic spring inceptor as disclosed herein may be used to provide a "yaw" or other input associated with rotation about a vertical or other axis orthogonal to an x-y or other reference plane of the inceptor. As in an example described above, at least a lower portion of an inceptor shaft may be mounted so as to be free to be rotated about its longitudinal axis, e.g., by twisting a hand grip about a central, substantially vertical axis. Magnetic spring resistance and/or return to neutral is provided in various embodiments by operation of a non-stationary set of magnets disposed radially around the inceptor shaft and affixed to a structure that is coupled to and rotates with the shaft, and a stationary set of magnets that remains stationary relative to a base assembly of the inceptor (i.e., does not move as the shaft rotates relative to the base), the stationary magnets being positioned opposite the non-stationary magnets in positions offset from the stationary magnets when in the neutral position, with like magnetic poles of the stationary and non-stationary magnets facing each other. Rotation of a hand grip or other manually (i.e., hand) operated movable structure of the inceptor rotates the non-stationary magnets to positions nearer corresponding ones of the stationary magnets, with like magnetic poles facing, producing a repulsive force at least a component of which acts in a direction opposite a direction in which the hand grip is being rotated by the operator.

In various embodiments, the inceptor includes one or more sensors that detect magnetic field changes produced when said non-stationary magnets are moved relative to said non-stationary magnets as described in the preceding paragraph, such as when a hand grip of the inceptor is rotated (twisted) about a substantially vertical axis by an operator. The sensor output in various embodiments may be mapped to a control value, such as a "yaw" or other control value.

FIG. 1 is a diagram illustrating an embodiment of a multicopter aircraft. In various embodiments, a magnetic spring inceptor as disclosed herein may be included in a multicopter aircraft as shown in FIG. 1. In the example shown, aircraft 100 includes a fuselage (body) 102 and wings 104. A set of three underwing booms 106 is provided under each wing. Each boom 106 has two lift fans 108 mounted thereon, one forward of the wing and one aft. Each lift fan 108 may be driven by an associated drive mechanism, such as a dedicated electric motor. One or more batteries (not shown) and/or onboard power generators (e.g., small gas turbine) may be used to drive the lift fans 108 and/or charge/recharge onboard batteries.

In the example shown in FIG. 1, a propeller 110 is mounted on the fuselage 102 and configured to push the aircraft through the air in the forward (e.g., x axis) direction when in a forward flight mode. The propeller 110 is positioned between a pair of tail booms 112 that extend aft and are joined at their aft end by a tail structure on which aerodynamic control surfaces including elevators 116 and rudders 118 are mounted. In various embodiments, each of the inboard booms 106 forms at least in part an integral part of the corresponding port/starboard side tail boom 112. In some embodiments, the tail booms 112 comprise extensions aft from the respective inboard booms 106. For example, the tail booms 112 may be formed as part of or fastened (e.g., bolted) to an aft end of the corresponding inboard boom 106. Additional control surfaces include ailerons 114 mounted on the trailing edge of wings 104.

In various embodiments, lift fans 108 may be used to provide lift to enable the multicopter aircraft 100 to takeoff, hover, and/or land vertically (or within a short horizontal distance) in a vertical flight mode. The multicopter aircraft 100 may be configured to use lift fans 108 to take off vertically, for example, and then transition into a forward flight mode in which the aircraft is pushed through the air by propeller 110 and the wings 104 provide lift. In the forward flight mode, in various embodiments, a lift fan lock mechanism as disclosed herein is used to lock lift fans 108 in a locked position.

In various embodiments, a magnetic spring inceptor as disclosed herein may be incorporated into multicopter aircraft 100 and may be configured to be used to control flight. For example, a magnetic spring inceptor as disclosed herein may be used by a pilot or other operator of multicopter aircraft 100 to control attitude of the multicopter aircraft 100, such as by indicating desired directions and/or degrees of pitch, roll, and/or yaw about corresponding axes with respect to a center of gravity (or other rotational center) 120. Roll, pitch, and/or yaw inputs provide via a magnetic spring inceptor as disclosed herein may be used by an onboard flight controller (e.g., a flight computer comprising flight control software running on a general purpose or special purpose hardware processor) to control aircraft attitude and flight by providing corresponding control signal to all or a subset of actuators, such as lift fans 108 and aerodynamic control surfaces 114, 116, and 118.

Figure 2:
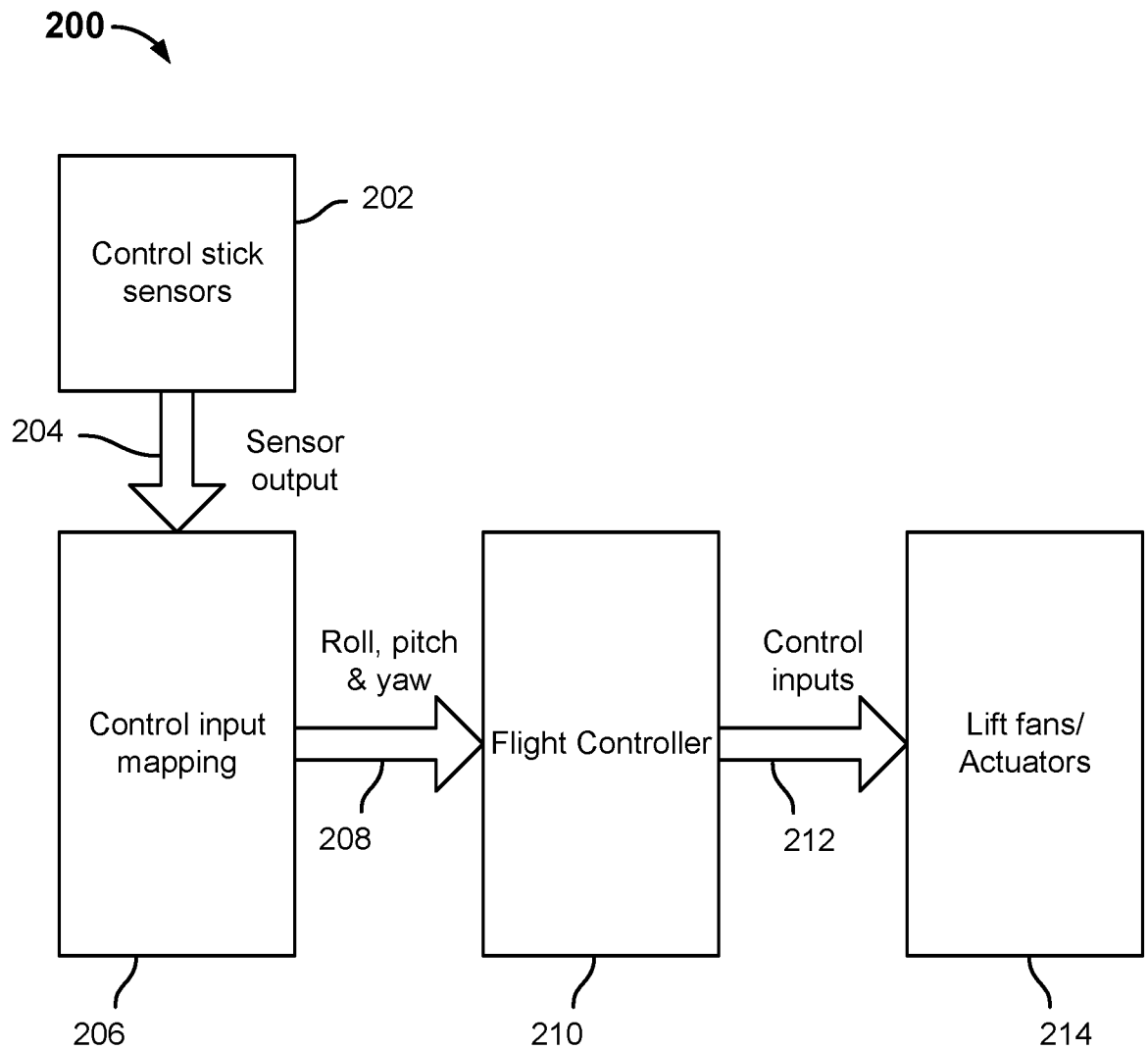
FIG. 2 is a block diagram illustrating an embodiment of a flight control system.

FIG. 2 is a block diagram illustrating an embodiment of a flight control system. In various embodiments, flight control system 200 of FIG. 2 may be included in and configured to control flight of an aircraft, such as multicopter aircraft 100 of FIG. 1. In the example shown, flight control system 200 includes a set of control stick (or other manual input device) sensors 202, which provide a set of sensor outputs 204 representative of a position to which an associated control stick (or other manual input device or "inceptor") has been manipulated. In various embodiments, sensors 202 may be included in a magnetic spring inceptor as disclosed herein, and sensor outputs 204 may be representative of detected changes in a magnetic field caused by manipulation of the magnetic spring inceptor in a manner that causes one or more magnets comprising the inceptor to be moved and/or reoriented, relative to one or more other magnets, a reference frame, etc.

In some embodiments, sensors 202 include one or more sets of Hall effect sensors. A Hall effect sensor is a transducer that varies its output voltage in response to a magnetic field. One type of Hall effect sensors is the "linear" Hall effect sensor, the voltage output of which varies linearly with magnetic flux density. In some embodiments, sensors 202 may include a set of linear Hall sensors configured to detect changes in a magnetic field orthogonal to an x-y plane of an inceptor. In some embodiments, sensors 202 may include two sets of linear Hall sensors, including a first set oriented to detect magnet field changes associated with side-to-side manipulation of an inceptor with which the sensors are associated and a second set oriented to detect magnet field changes associated with forward-and-back manipulation of the inceptor.

The flight control system 200 of FIG. 2 includes a control input mapping module or block 206 configured to receive sensor outputs 204 and map such outputs 204 to corresponding roll, pitch, and/or yaw commands 208. For example, control input mapping module or block 206 may be a software module running on a general purpose or special purpose processor, and may comprising computer instructions to perform table lookups based on outputs 204 (e.g., respective voltage levels provided as output by each of a plurality of Hall sensors) to determine for a given set of sensor outputs 204 a corresponding set of roll, pitch, and/or yaw commands, as applicable.

In the example shown in FIG. 2, the roll, pitch, and/or yaw commands 208 are provided as inputs to a conventional flight controller 210, sometimes referred to as a flight control computer. The flight controller 210 may comprise software instructions executed by a processor, and may include computer instructions to determine for a given set of roll, pitch, and/or yaw commands 208 a corresponding set of control inputs 212 to be provided to corresponding aircraft "actuators" 214, such as lift fans, propellers, and/or aerodynamic control surfaces such as rudders, elevators, and ailerons.

Figure 3:
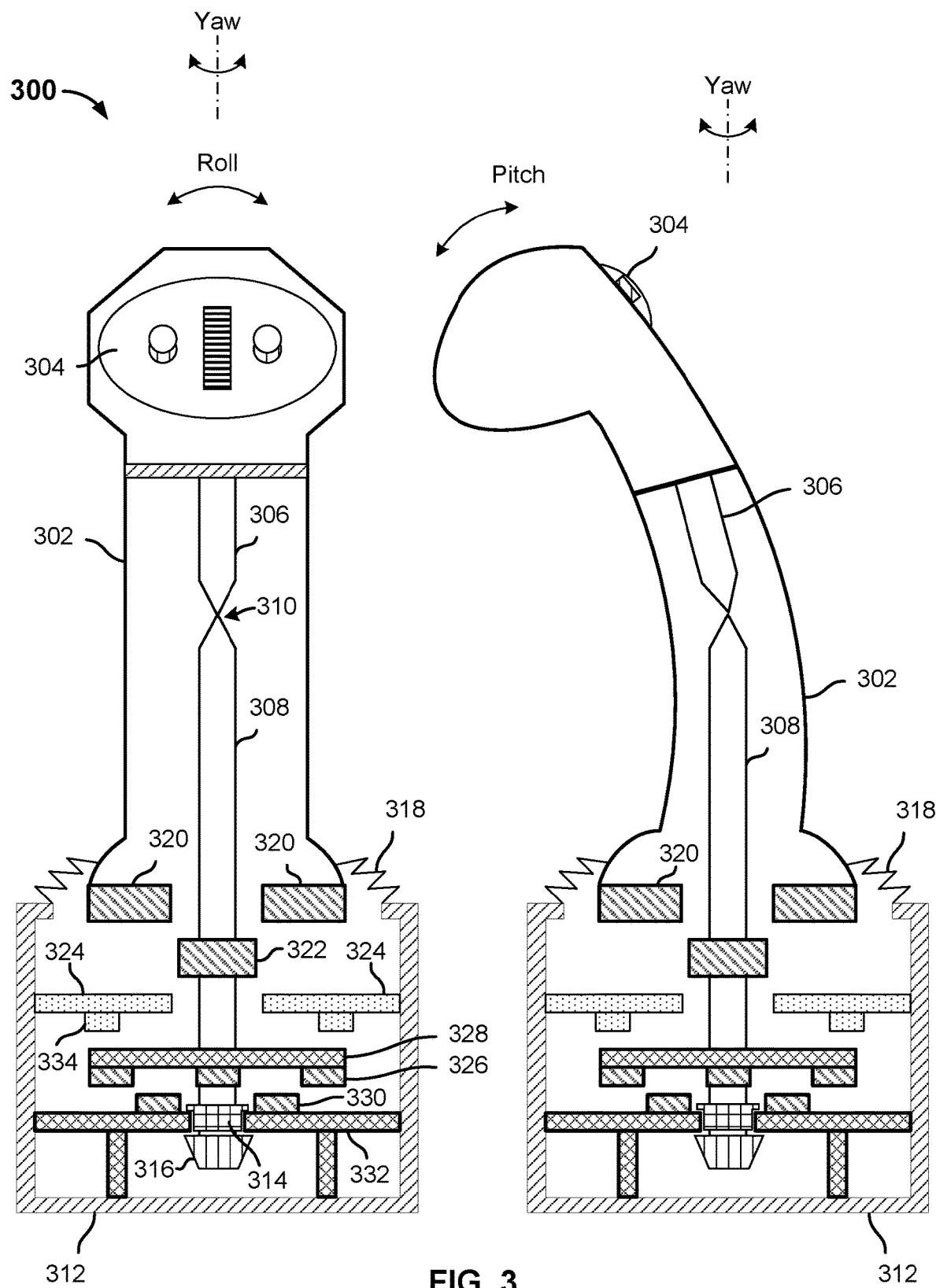
FIG. 3 is a block diagram illustrating an embodiment of a magnetic spring inceptor.

FIG. 3 is a block diagram illustrating an embodiment of a magnetic spring inceptor. In various embodiments, magnetic spring inceptor 300 of FIG. 3 may be incorporated into an aircraft, such as multicopter aircraft 100 of FIG. 1, to provide manual control inputs to a flight control system, such as flight control system 200 of FIG. 2.

In the example shown, magnetic spring inceptor 300, which is shown in FIG. 3 in a front view (at left) and a left side view (at right), includes a hand grip 302 comprising a rigid casing surrounding an at least partly hollow core. A set of thumb operated controls 304 are mounted on a faceplate at a distal, free-moving end of the hand grip 302. In the example shown, thumb operated controls 304 include a central thumbwheel and left/right buttons. In some embodiments, thumb operated controls 304 may be manipulated to generate electrical and/or electronic inputs to which electronics not shown in FIG. 3 are responsive. Thumb operated controls 304 may be used to operate a cursor, control altitude, activate weapons or other auxiliary or non-flight control systems, etc.

As indicated by the axes and arrows shown at the top of FIG. 3, in various embodiments the magnetic spring inceptor 300 of FIG. 3 may be used to control one or more of roll, pitch, and/or yaw of an aircraft. In the example shown, roll is controlled by manipulating hand grip 302 side-to-side, pitch is controlled by manipulating hand grip 302 side-to-side, and yaw is controlled by twisting hand grip 302 about a vertical axis, as shown. In the example shown, hand grip 302 is mounted rigidly to an upper axial shaft 306. Upper axial shaft 306 in turn is couple via a universal joint 310, such as a Hooke joint, to a lower axial shaft 308.

A lower end of lower axial shaft 308 extends into a base assembly 312 of magnetic spring inceptor 300, and is rotatably mounted in and to the base assembly 312 by a journal (or other) bearing or coupling 314 and an associated bearing nut 316. Together, bearing/coupling 314 and bearing nut 316 secure lower axial shaft 308 in the upright position shown, preventing the lower axial shaft 308 from being moved vertically or laterally, while allowing lower axial shaft 308 to be rotated about its longitudinal axis, corresponding in this example to the yaw input/axis as shown. A flexible coupling 318, e.g., a sleeve made of rubber or other flexible material, prevents dirt from entering an interior cavity of base assembly 312 while allowing hand grip 302 to be manipulated about three axes, i.e., side-to-side, fore-and-aft, and twisted about a longitudinal/vertical axis. Universal joint 310 transmits torsional (twisting) forces applied via hand grip 302 to the lower axial shaft 308, enabling yaw inputs to be provided and detected as described more fully below. Universal joint 310 in various embodiments transmits torsional forces regardless of an angular position of the hand grip 302, e.g., relative to a neutral or other reference position in an x-y plane of magnetic spring inceptor 300, while allowing hand grip 302 to be manipulated side-to-side and/or forward-and-aft, for example by rotating hand grip 302 right or left and/or forward or back about a center of rotation that coincides with universal joint 310.

Referring further to FIG. 3, in the example shown non-stationary magnet(s) 320 is/are mounted within hand grip 302 in a position adjacent to a stationary magnet 322 mounted fixedly on lower axial shaft 308. In various embodiments, non-stationary magnet 320 may be a single magnet, for example a magnet shaped as a ring. Stationary magnet 322 may be a smaller ring coupled fixedly to lower axial shaft 308. In various embodiments, the non-stationary magnet 320 and stationary magnet 322 each may be polarized substantially along a longitudinal axis, resulting in magnets having opposite poles on the upper and lower faces of the magnets 320, 322. In various embodiments, the non-stationary and stationary magnets 320, 322, respectively, may be incorporated into a magnetic spring inceptor as disclosed herein, such as magnetic spring inceptor 300 of FIG. 3, with like poles facing each other, resulting in a repulsive force being generated and experienced when the hand grip (e.g., hand grip 302) is manipulated relative to a neutral position (e.g., a position substantially orthogonal to an x-y plane of the magnetic spring inceptor 300). In the example shown in FIG. 3, for example, tilting the hand grip 302 side-to-side and/or fore-and-aft would cause the hand grip 302 to be rotated about a center of rotation coincident or otherwise associated with the universal joint 310, resulting in at least a portion of the non-stationary magnet(s) 320 to be moved nearer to non-stationary magnet 322. Since the faces/sides of non-stationary magnet(s) 320 and stationary magnet 322 having the same polarity would be brought near to each other, a repulsive magnetic force would be generated and experienced by the operator, providing haptic feedback similar to that provided in conventional inceptors by mechanical springs. In some embodiments, the magnetic repulsive force may tend to return the hand grip 302 to the neutral position, e.g., if the operator were to release the hand grip 302 and/or release at least some of the force applied to manipulate the hand grip 302, similarly to the way in which in conventional inceptors mechanical springs may be used to return a hand grip to a neutral/center position.

In various embodiments, changes in the net magnetic field generated by changing the position of the non-stationary magnet(s) 320 relatively to the stationary magnet 322 may be measured to determine a roll and/or pitch command/level associated with manipulation of the hand grip 302. Referring further to FIG. 3, the magnetic spring inceptor 300 further includes a set of upper sensors 324. In some embodiments, the upper sensors 324 may include a plurality of linear Hall sensors disposed on a substrate. The linear Hall sensors may be deployed on either side of the magnets 320, 322, for example along axis with respect to which inputs provided via magnetic spring inceptor 300 is to be used to be sensed, such as the x (e.g., roll) and y (e.g., pitch) axes of magnetic spring inceptor 300.

In some embodiments, manipulation of hand grip 302 relative to the x and/or y axes of magnetic spring inceptor 300 may be sensed and measured by comparing the output of linear Hall sensors comprising related pairs (or larger sets), each pair (or larger set) associated with a corresponding detection axis. For example, in the case of a pair of x-axis (roll) sensors having outputs $H_2$ and $H_1$, respectively, a normalized distance (difference) may be computed as follows:

$$\frac{H_2 - H_1}{H_2 + H_1}$$

The resulting normalized difference value may be used to perform a lookup to determine an associated roll (or pitch) command level to which the operator input provided via manipulation of the magnetic spring inceptor is mapped. In some embodiments, such mapping is performed by a control input mapping module, such as control input mapping module 206 of FIG. 2.

In various embodiments, one or more of the size, shape, and strength of the non-stationary magnet(s) 320 and stationary magnet 322, along with the orientation, placement, and relative spacing in the horizontal and vertical directions (as shown in FIG. 3) are selected at least in part to achieve a desired level of magnetic repulsive force as the non-stationary magnet(s) 320 is/are brought into closer proximity to stationary magnet 322 due to manipulation of hand grip 302, as described above. The desired force may be determined by a design engineer based at least in part on considerations such as achieving a force necessary to return the hand grip 302 to the neutral position, e.g., upon force being applied by an operator to the hand grip being released, and/or a desired level of haptic feedback to the operator.

In various embodiments, one or more of the size, shape, and strength of the non-stationary magnet(s) 320 and stationary magnet 322, along with the orientation, placement, and relative spacing in the horizontal and vertical directions (as shown in FIG. 3), and in addition the characteristics and arrangement of the upper sensors 324, and the placement of sensors 324 relative to the magnets 320, 322, in both the horizontal and vertical directions, are selected at least in part to achieve a desired range of sensor output (response) through an expected range of motion of the non-stationary magnets 320 relative to one or both of the sensors 324 and stationary magnet 322.

Referring further to FIG. 3, in the example shown magnetic spring inceptor 300 includes components to provide magnetic spring resistance to manipulation of hand grip 302 about a substantially longitudinal/vertical (e.g., z or yaw) axis of magnetic spring inceptor 300. Specifically, in the example shown, magnetic spring inceptor 300 includes a set of non-stationary magnets 326 coupled mechanically to lower axial shaft 308 by a mounting plate 328 fixedly attached to lower axial shaft 308. As the lower axial shaft 308 is rotated about its longitudinal axis, e.g., in response to a twisting force/torque applied to/via hand grip 302, the mounting plate 328 and non-stationary magnets 326 rotate with it (i.e., with lower axial shaft 308). A complementary set of stationary magnets 330 are disposed on a base 332 mounted fixedly within base assembly 312, such that the stationary magnets 330 do not move when the lower axial shaft 308, and the non-stationary magnets 326 coupled thereto, are rotated.

In various embodiments, non-stationary magnets 326 and stationary magnets 330 are mounted with like magnetic poles facing each other (e.g., north pole facing down in the case of non-stationary magnets 326 and up in the case of stationary magnets 330). As a result, as lower axial shaft 308 is rotated about its longitudinal axis, non-stationary magnets 326 come into closer proximity to adjacent ones of stationary magnets 330, resulting in a magnetic repulsive force being generated and experienced. Similar to the force described above with respect to the roll (x) and pitch (y) axes, the repulsive force in various embodiments tends to return the hand grip 302 to a neutral/zero position, e.g., once a twisting force/torque applied to the hand grip 302 by an operator is released. In addition, the strength, size, and arrangement of the non-stationary magnets 326 and stationary magnets 330 in various embodiments is such that a desired degree of haptic feedback is provided to the operator in response to the hand grip 302 being rotated about the longitudinal axis of lower axial shaft 308.

Referring further to FIG. 3, magnetic force inceptor 300 further includes a set of lower (daughter) sensors 334 to detect/measure magnetic field changes associated with movement of non-stationary magnets 326 relative to stationary magnets 330 associated with rotation of hand grip 302 about the longitudinal axis of lower axial shaft 308. In various embodiments, lower sensors 334 may be linear or other Hall sensors. Changes in sensor output may be normalized, as described above, and mapped to corresponding yaw command levels, similar to the processing described above with respect to the roll and pitch axes. Such processing may be performed in some embodiments by a control input mapping module, such as control input mapping module 206 of FIG. 2.

In various embodiments, the number and arrangement of one or both of non-stationary magnets 326 and stationary magnets 330 may be determined at least in part to minimize the effect that such magnets and/or movement thereof will have on the upper sensors 324. For example, in some embodiments, an even number of non-stationary magnets 326 and stationary magnets 330 are used, and each set is arranged in a pattern that is symmetrical with respect to the x and y axes of magnetic force inceptor 300. As a result, the non-stationary magnets 326 and stationary magnets 330 have no effect and/or offsetting effects with respect to the magnetic field component(s) measured by the upper sensors 324, which in various embodiments may be configured to detect changes in a magnetic field component that is orthogonal to the x-y plane of magnetic spring inceptor 300.

Figure 4A:
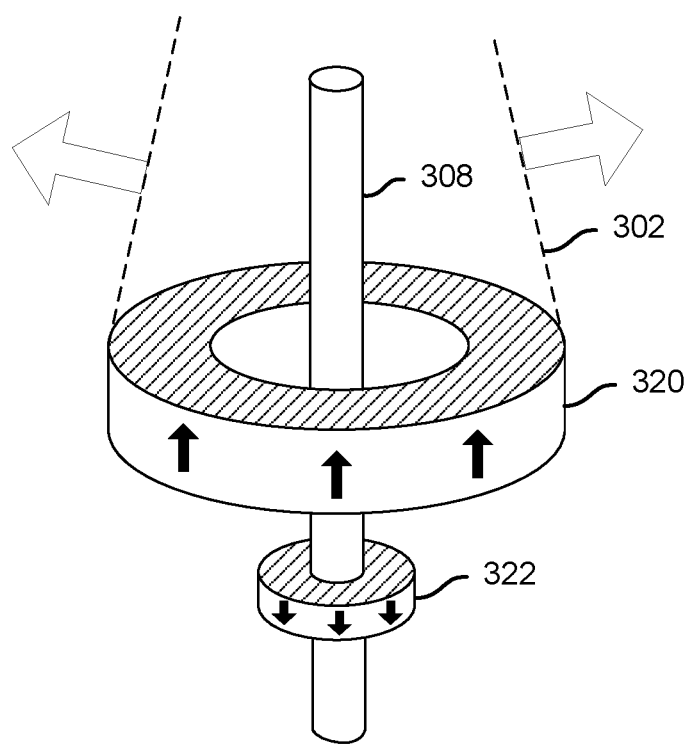
FIG. 4A is a diagram illustrating an embodiment of an x-y axis magnetic spring section of a magnetic spring inceptor.

FIG. 4A is a diagram illustrating an embodiment of an x-y axis magnetic spring section of a magnetic spring inceptor. In various embodiments, the structures shown in FIG. 4A may be used to implement correspondingly numbered structures in the magnetic spring inceptor 300 of FIG. 3. In the example shown, non-stationary magnet 320 comprises a single, ring-shaped magnet, having in this example the form of a relatively flat (i.e., height less than inner and outer diameter) right circular hollow cylinder. The upward pointing arrows indicate the non-stationary magnet 320 have been polarized in the direction of its longitudinal axis, with the "north" pole being associated with the upper face as shown, and the "south" pole being associated with the lower face (not visible in the view shown). Stationary magnet 322 coupled to lower axial shaft 308 is shown to comprise a smaller ring-shaped magnet, having a form similar to that of non-stationary magnet 320. As shown, stationary magnet 322 has been magnetized along its longitudinal axis and has been oriented with its south pole facing up, as shown. As a result, the south pole face of non-stationary magnet 320 is opposite the south pole face of stationary magnet 322. Movement of non-stationary magnet 320 relative to stationary magnet 322, e.g., by manipulation of hand grip 302 as indicated by the left and right arrows shown originating at hand grip 302, would result in a portion of non-stationary magnet 320 being moved nearer to an opposite portion of stationary magnet 322, with like magnet poles facing, resulting in a magnetic repulsive force, as described above.

Figure 4B:
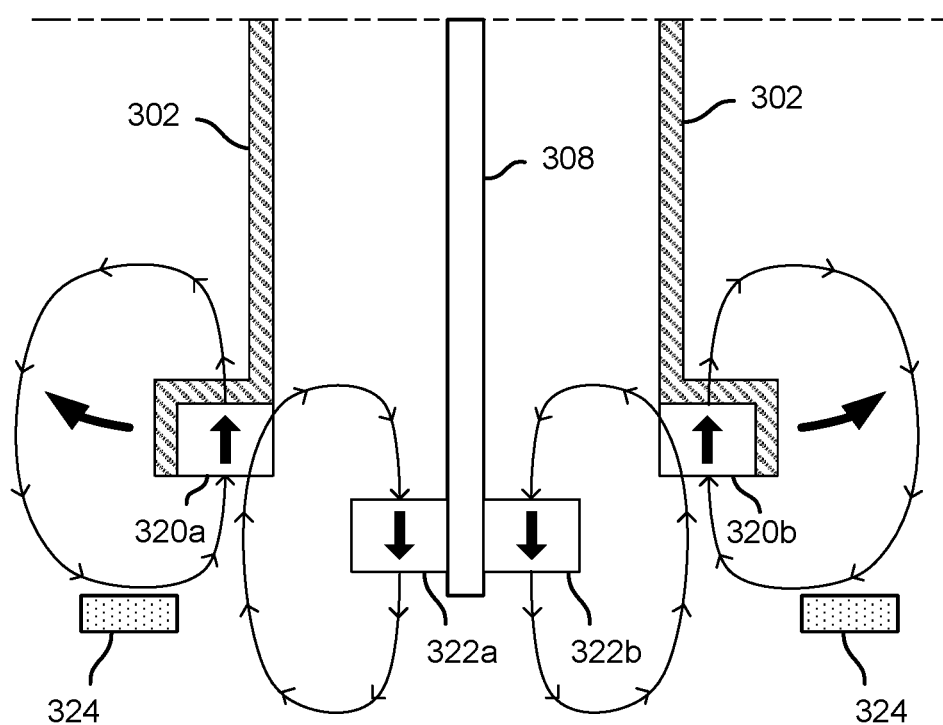
FIG. 4B is a diagram illustrating an embodiment of an x-y axis magnetic spring and sensor section of a magnetic spring inceptor.

FIG. 4B is a diagram illustrating an embodiment of an x-y axis magnetic spring and sensor section of a magnetic spring inceptor. In various embodiments, the structures shown in FIG. 4B may be used to implement correspondingly numbered structures in the magnetic spring inceptor 300 of FIG. 3. In some embodiments, the view shown in FIG. 4B may comprise in part a front cross-sectional view of the structures shown in FIG. 4A. In the example shown in FIG. 4B, left and right side parts of non-stationary magnet 320, labeled as 320a and 320b, respectively, in FIG. 4B are positioned opposite corresponding parts of stationary magnet 322, labeled as 322a and 322b, respectively, in FIG. 4B, with like magnetic poles facing, as shown. FIG. 4B further shows linear Hall sensors 324 positioned below and outside the non-stationary magnet 320 and stationary magnet 322. For clarity, the respective magnetic field of each magnet/portion thereof (320a, 320b, 322a, 322b) is represented by a single field line. FIG. 4B illustrates that in the neutral position, as shown, the magnet repulsive force between non-stationary magnet 320 and stationary magnet 322 would be minimal and in any case evenly balanced. Movement of the non-stationary magnet 320 left or right, as indicated by the curved black arrows would result in a magnetic repulsive force being generated due to the part of the non-stationary magnet 320 opposite the direction of movement being moved nearer a corresponding part of stationary magnet 322. In addition, the movement would result in a change to the component of the net/combined magnetic that is orthogonal to the x-y plane (i.e., the vertical component as shown), which would be reflected in a measurable difference in the output of sensors 324, the changed output of which can be mapped as described above to corresponding roll and/or pitch command levels.

In various embodiments, release of force on the hand grip 302 would result in the magnetic force inceptor returning to the neutral position, as shown, and the sensors providing equal output values, which in various embodiments would be mapped to a zero roll input and zero pitch input state.

Figure 5:
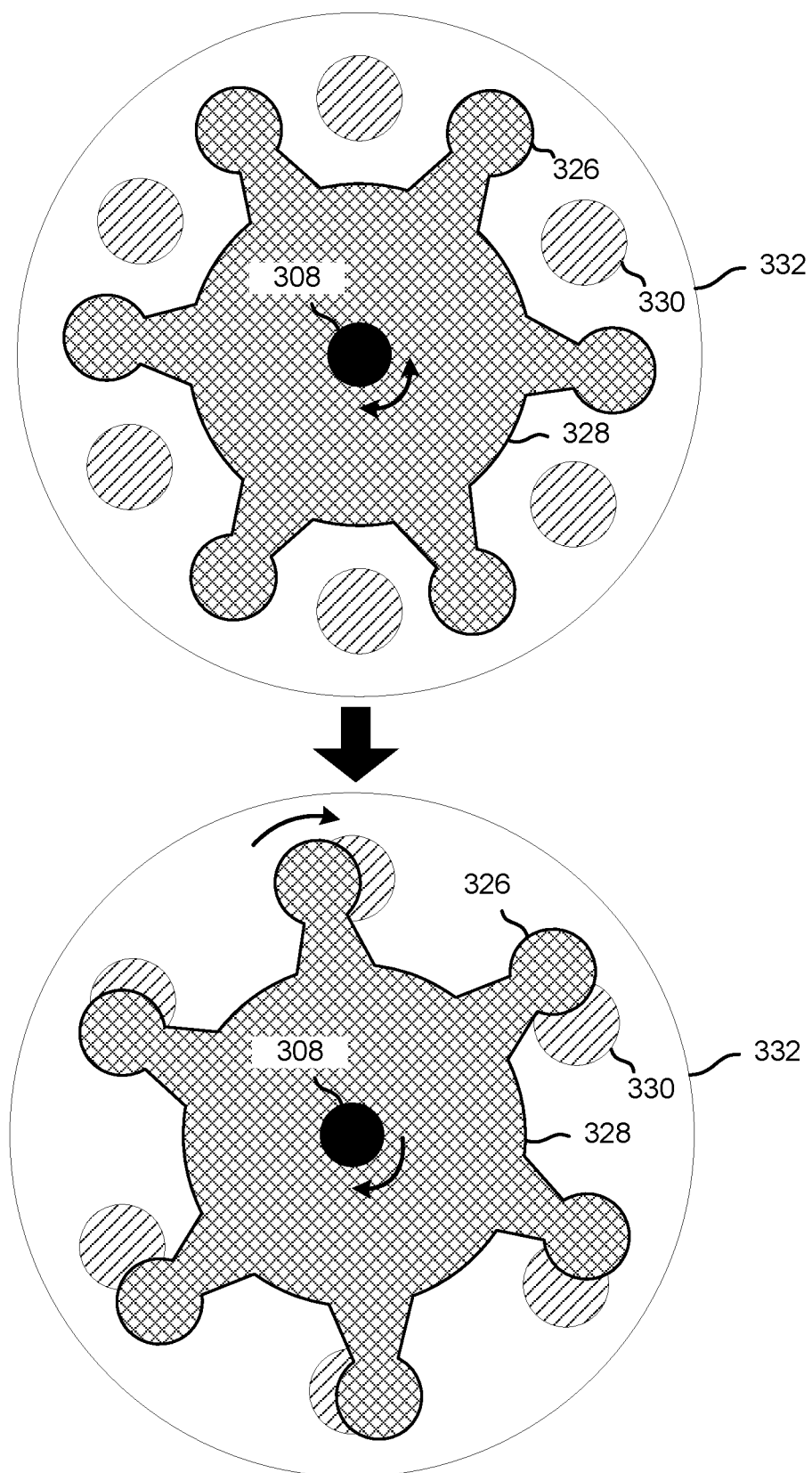
FIG. 5 is a block diagram illustrating from a top down view an embodiment of a z axis magnetic spring section of a magnetic spring inceptor.

FIG. 5 is a block diagram illustrating from a top down view an embodiment of a z axis magnetic spring section of a magnetic spring inceptor. In various embodiments, the structures shown in FIG. 5 may be used to implement correspondingly numbered structures in the magnetic spring inceptor 300 of FIG. 3. In the example shown, mounting plate 328 is shown to have six evenly-spaced non-stationary magnets 326 mounted thereon, in an arrangement around lower axial shaft 308 that is symmetrical with respect to the pitch (horizontal, as shown) and roll (vertical, as shown) axes of the magnetic spring inceptor. A complementary, evenly offset array of stationary magnets 330 are shown to be disposed on base 332. The non-stationary magnets 326 are oriented so as to have facing downward a pole of like polarity to an opposite side/face of stationary magnets 330.

The upper image in FIG. 5 shows the illustrated components in the neutral position. The lower image of FIG. 5 shows the same components in a position in which the lower axial shaft 308 and the mounting plate 328 and non-stationary magnets 326 attached thereto have been rotated clockwise, to a position in which the non-stationary magnets 326 overlap with corresponding ones of the stationary magnets 330 positioned opposite them. As a result, a magnetic repulsive force would be present and would tend to push the non-stationary magnets 326, and the mounting plate 328 and lower axial shaft 308 to which they are attached, back to the neutral position, as described above.

In various embodiments, rotating the components shown in FIG. 5 to the position shown in the lower image of FIG. 5 would result in changes to a combined magnetic field associated with the non-stationary magnets 326 and stationary magnet 330, which would be measured by sensors such as lower sensors 334 of FIG. 3, the output of which may be mapped to a corresponding yaw (or other) input command, as described above.

As noted above, arranging the non-stationary magnets 326 and stationary magnets 330 in symmetrical patterns comprising even numbers of magnets results in those magnets having neutral/offsetting effects on the sensors associated with detecting pitch and/or roll inputs, as described above.

Figure 6:
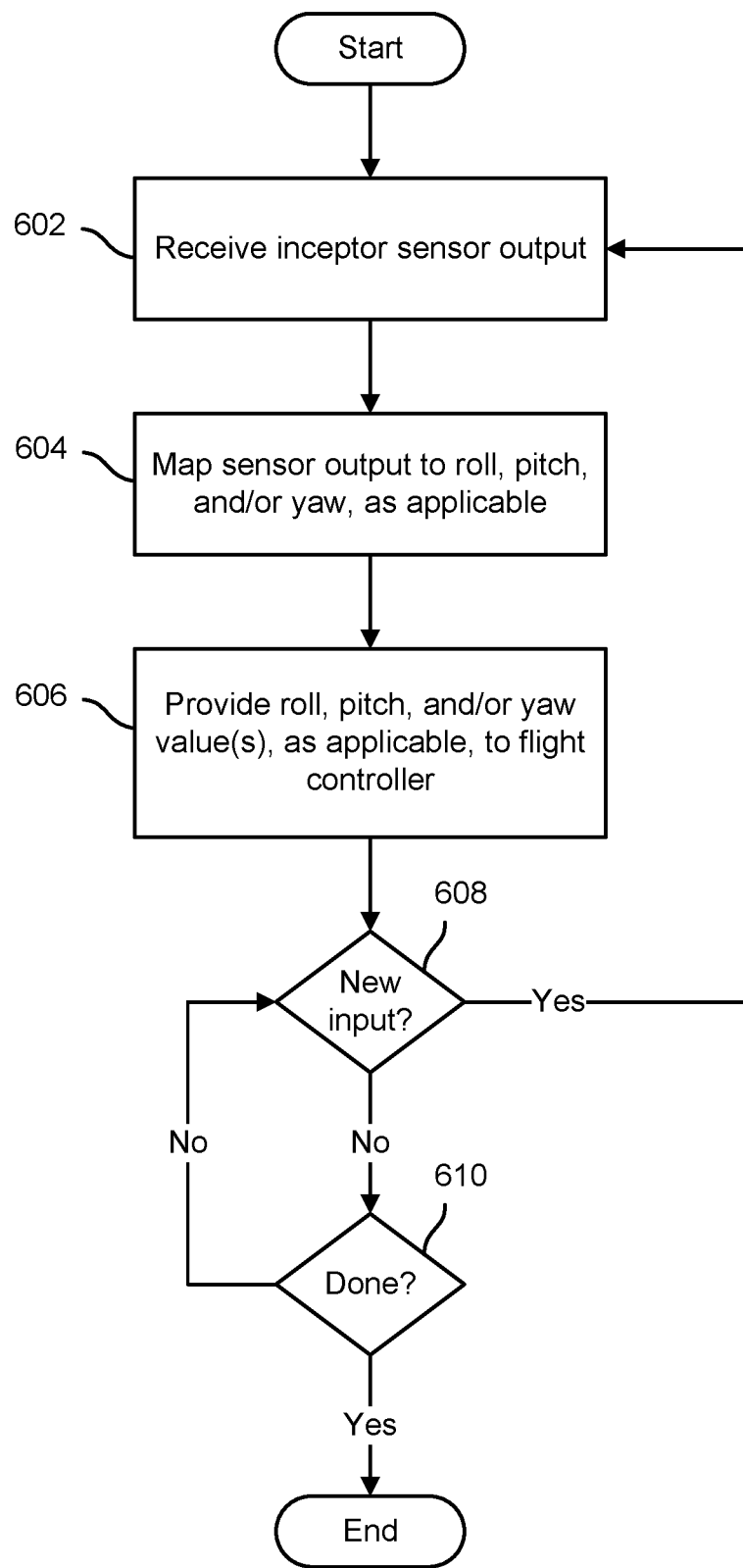
FIG. 6 is a flow chart illustrating an embodiment of a process to map magnetic spring inceptor sensor output to flight control commands.

FIG. 6 is a flow chart illustrating an embodiment of a process to map magnetic spring inceptor sensor output to flight control commands. In various embodiments, the process of FIG. 6 may be implemented by a component of a flight control system, such as control input mapping module 206 of FIG. 2. In the example shown, inceptor sensor output is received (602). For example, the output of one or more sets of Hall sensors, such as sensors 324 and/or 334 in the example shown in FIG. 3, may be received. Received sensors outputs (e.g., Hall sensor output voltages) are mapped to one or more of roll, pitch, and/or yaw commands/levels, as applicable (604). In various embodiments, sensor outputs associated with each of a plurality of axes (e.g., roll, pitch, and/or yaw, in the case of an aircraft) are received and mapped to a corresponding command/level for that axis. Roll, pitch, and/or yaw values to which received sensor outputs have been mapped, as applicable, are provided, e.g., to a flight controller such as flight controller 210 of FIG. 2. As new/changed inputs are received (608), the values are mapped to corresponding roll, pitch, and/or yaw values, as applicable (602, 604, 606). Processing of sensor output continues until done (610), e.g., the system being controlled by the magnetic spring inceptor is shut down.

In various embodiments, techniques disclosed herein may be used to provide an inceptor that returns to a center/neutral position and/or provides a haptic feedback (resistance) to an operator without using mechanical springs, which may wear out due to material fatigue after a certain number of cycles, and which may require that a "breakout" force be applied to begin to move them from a neutral position. In various embodiments, techniques disclosed herein may be used to sense magnetic field changes associated with manipulation of an inceptor, and to map associated sensor output values to corresponding control input values (e.g., commands) associated with corresponding axes, such as roll, pitch, and/or yaw commands, in the case of an inceptor used in flight control.

While one or more examples described above involve use of a magnetic spring inceptor as disclosed herein to control flight of an aircraft, a magnetic spring inceptor as disclosed herein may be used in other applications and contexts as well, including without limitation to control a cursor, a robot, electronic game play, a drone, a manned or unmanned spacecraft, an active or passive guided weapon (such as a guided missile or a bomb with remotely controlled aerodynamic control surfaces), a manned or unmanned watercraft, such as a submarine, a crane, a land based vehicle, heavy or light equipment, etc.

In various embodiments, a magnetic spring inceptor as disclosed herein may be used to provide return-to-center and/or to provide haptic feedback to an operator while using a sensor other than (or in addition to, or as a backup to) a Hall sensor or other magnetic field sensor to measure a degree of manipulation of the inceptor. For example, optical or other sensors may be used in some embodiments to sense a position of the magnetic spring inceptor relative to some reference.

While in a number of embodiments described above a magnetic force inceptor that can be rotated with respect to three axes (roll, pitch, and yaw, for example), is disclosed, in various embodiments, magnetic force inceptors embodying techniques disclosed herein may have more or fewer degrees of freedom. For example, in some embodiments, a magnetic spring inceptor as disclosed herein may comprise a joystick capable of being manipulated with respect to just the x and y axes (e.g., not a vertical or other longitudinal axis). Magnetic springs comprising non-stationary magnets disposed opposite and adjacent to corresponding stationary magnets, with like poles facing, may be used to provide a repulsive force as described herein to tend to return the joystick to a neutral position and/or to provide haptic feedback. For example, structures similar to non-stationary magnet 320 and stationary magnet 322 of FIGS. 3, 4A, and 4B may be used. In some embodiments, position of the joystick may be sensed using linear Hall sensors, similar to sensors 324 of FIGS. 3 and 4B, and sensor outputs may be mapped to corresponding input/command levels.

In some embodiments, a twistable knob, wheel, or other manual input structure may comprise a magnetic force inceptor as disclosed herein. Structures similar to non-stationary magnets 326, stationary magnets 330, and lower sensors 334 of FIGS. 3 and 5 may be used to provide a magnetic repulsive force that tends to return the manual input device to a center/neutral position and/or provide haptic feedback, to sense a degree to which the manual input device has been displaced, and to map the sensed displacement to a corresponding value or level of an associated input parameter.

In various embodiments, a magnetic force inceptor comprising manual input structures capable of being manipulated in one or more associated directions and/or about one or more associated axes may be provided, including without limitation a lever, thumbwheel, push button, or other manual input structures.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An input device, comprising:
   a manual input structure movably coupled to a base assembly;
   a non-stationary magnet fixedly coupled to the manual input structure, wherein the non-stationary magnet comprises a first ring-shaped magnet having an upper face and a lower face having a first magnetic polarity;
   a stationary magnet coupled to the base assembly in a manner that is fixed with respect to at least a first input axis of the input device, the stationary magnet being coupled to the base assembly with a first magnetic pole having the first magnetic polarity oriented opposite a corresponding magnetic pole of the non-stationary magnet having the first magnetic polarity, in a position that is adjacent to but offset from the non-stationary magnet when the manual input structure is in a neutral position; and
   one or more magnetic field sensors configured to provide an output representative of at least a component of a combined magnetic field associated with the non-stationary magnet and the stationary magnet, wherein the non-stationary magnet is coupled to the manual input structure in a position such that movement of the manual input structure about or along the first input axis of the input device brings magnetic poles having the first magnetic polarity within sufficient proximity to generate a repulsive magnetic force.

2. The input device of claim 1, wherein the first input axis comprises an x axis associated with an x-y plane of the base assembly.

3. The input device of claim 2, wherein the manual input structure is coupled to the base assembly via a universal joint.

4. The input device of claim 3, wherein the universal joint enables the manual input structure to be rotated with respect to the x axis and a y axis of the x-y plane.

5. The input device of claim 1, wherein the stationary magnet comprises a second ring-shaped magnet having an outer radius smaller than an inner radius of the non-stationary magnet and an upper face with the first magnetic polarity.

6. The input device of claim 1, wherein the non-stationary magnet is coupled fixedly to a lower axial shaft that extends through a middle cavity of the manual input structure and a center hole of the non-stationary magnet, the lower axial shaft being connected to a universal joint at an upper end.

7. The input device of claim 6, further comprising an upper axial shaft connected to an end of the universal joint opposite the lower axial shaft, the upper axial shaft being coupled fixedly to the manual input structure.

8. The input device of claim 7, wherein the universal joint is located approximately at one or more of a center of gravity of the manual input structure; a geometric center of a hand-gripped portion of the manual input structure; and a center of rotation about an x axis and a y axis of the manual input structure.

9. The input device of claim 1, wherein the first input axis comprises an axis associated with a vertical, longitudinal axis of the manual input structure.

10. The input device of claim 9, wherein the non-stationary magnet comprises a set of non-stationary magnets arranged in a symmetrical array in a plane substantially parallel to an x-y plane of the input device, the set of non-stationary magnets being mounted on a base plate mounted fixedly to an axial shaft to which the manual input structure is coupled in a manner such that rotation of the manual input structure with respect to the first input axis causes the base plate and the set of non-stationary magnets to be rotated about the first input axis.

11. The input device of claim 10, wherein the stationary magnet comprises a set of stationary magnets arranged in a complementary arrangement opposite the set of non-stationary magnets, the complementary arrangement resulting the set of stationary magnets being offset from corresponding adjacent ones of the set of non-stationary magnets when the manual input structure is in a neutral position.

12. The input device of claim 11, wherein rotation of the manual input structure about the first input axis causes the set of non-stationary magnets to be moved into closer proximity to the corresponding adjacent ones of the set of stationary magnets, resulting in the repulsive magnetic force being generated.

13. The input device of claim 1, wherein the one or more magnetic field sensors comprise linear Hall effect sensors.

14. The input device of claim 1, wherein the output is provided via an output connection to a control system comprising a processor configured to map the output to a input value associated with the first input axis.

15. The input device of claim 1, wherein the one or more magnetic field sensors comprise a pair of sensors arranged along an axis parallel to the first input axis.

16. The input device of claim 1, wherein the non-stationary magnet comprises:
a set of non-stationary magnets arranged in a symmetrical array in a plane substantially parallel to an x-y plane of the input device, the set of non-stationary magnets being mounted on a base plate mounted fixedly to an axial shaft to which the manual input structure is coupled.

17. The input device of claim 16, wherein the stationary magnet comprises:
a ring-shaped stationary magnet having an outer radius smaller than an inner radius of the first ring-shaped magnet of the non-stationary magnet and an upper face with the first magnetic polarity; and
a set of stationary magnets arranged in a complementary arrangement opposite the set of non-stationary magnets, the complementary arrangement resulting the set of stationary magnets being offset from corresponding adjacent ones of the set of non-stationary magnets when the manual input structure is in a neutral position.

18. The input device of claim 17, wherein rotation of the manual input structure about the first input axis causes the set of non-stationary magnets to be moved into closer proximity to the corresponding adjacent ones of the set of stationary magnets, resulting in the repulsive magnetic force being generated.

19. The input device of claim 17, wherein the one or more magnetic field sensors comprises:
a set of upper sensors positioned on both sides of the first ring-shaped magnet of the non-stationary magnet and the ring-shaped stationary magnet, and adapted to measure magnetic field changes resulting from a movement of the first ring-shaped magnet of the non-stationary magnet relative to the ring-shaped stationary magnet; and
a set of lower sensors positioned on both sides of the set of non-stationary magnets and the set of stationary magnets, and adapted to measure magnetic field changes resulting from a movement of the set of non-stationary magnets relative to the set of stationary magnets.

* * * * *